United States Patent
Wei et al.

(10) Patent No.: US 10,617,957 B2
(45) Date of Patent: Apr. 14, 2020

(54) SYSTEMS AND METHODS FOR REDUCING FRAUD IN ELECTRONIC GAMES HAVING VIRTUAL CURRENCY

(71) Applicant: Peerless Media Ltd., Gibraltar (GI)

(72) Inventors: Huiqian Wei, Beijing (CN); Langfeng Xu, Wuxi (CN); Huaipeng Yan, Beijing (CN); Shi Qiu, Beijing (CN)

(73) Assignee: Peerless Media Ltd., Gibraltar (GI)

( * ) Notice: Subject to any disclaimer, the term of this patent is extended or adjusted under 35 U.S.C. 154(b) by 25 days.

(21) Appl. No.: 15/635,430

(22) Filed: Jun. 28, 2017

(65) Prior Publication Data

US 2018/0001207 A1    Jan. 4, 2018

(30) Foreign Application Priority Data

Jun. 29, 2016 (CN) .......................... 2016 1 0649773

(51) Int. Cl.
*A63F 13/75* (2014.01)
*A63F 13/792* (2014.01)
*G07F 17/32* (2006.01)

(52) U.S. Cl.
CPC ............ *A63F 13/75* (2014.09); *A63F 13/792* (2014.09); *G07F 17/3241* (2013.01)

(58) Field of Classification Search
CPC ... G07F 17/3241; G07F 17/3293; A63F 13/75
USPC ..................................................... 463/13, 42
See application file for complete search history.

(56) References Cited

U.S. PATENT DOCUMENTS

| | | | |
|---|---|---|---|
| 5,768,382 A | 6/1998 | Schneier | |
| 5,779,549 A | 7/1998 | Walker et al. | |
| 6,244,958 B1* | 6/2001 | Acres ....................... | G07F 17/32 463/16 |
| 8,047,909 B2 | 11/2011 | Walker et al. | |
| 8,500,553 B2 | 8/2013 | Olomskiy | |

(Continued)

FOREIGN PATENT DOCUMENTS

| | | |
|---|---|---|
| WO | 0067424 | 11/2000 |
| WO | 2006036100 A1 | 4/2006 |

(Continued)

OTHER PUBLICATIONS

Roman V. Yampolskiy, "Detecting and Controlling Cheating in Online Poker," accessed on May 26, 2016, University at Buffalo, Buffalo, New York (6 pages.).

*Primary Examiner* — Chase E Leichliter
(74) *Attorney, Agent, or Firm* — Beem Patent Law Firm

(57) ABSTRACT

Reducing fraud and collusion in an online multiplayer game having a virtual currency, such as poker chips, may include managing the distribution of virtual currency giveaways and limiting collusion among players likely to be using virtual currency obtain by the giveaways. In some embodiments, free chip distribution pools may be established to limit the amount of free chips distributed via (1) a particular distribution method, (2) to a particular player, (3) a combination of player and distribution method, and the like. Players also may be automatically assigned to a particular table and/or seat at the table based on a variety of factors that may indicate a likelihood that the player is using free chips, such as the player's level, the age of the player's account, the buy-in for a given table requested by the user, and the like. Other implementations also are described.

7 Claims, 6 Drawing Sheets

(56) References Cited

U.S. PATENT DOCUMENTS

| | | |
|---|---|---|
| 8,960,676 B2 | 2/2015 | Costa |
| 8,992,319 B1 | 3/2015 | Pascal et al. |
| 9,050,530 B2 | 6/2015 | Sivak |
| 9,101,833 B2 | 8/2015 | Behmaram-Mosavat et al. |
| 9,211,474 B2 | 12/2015 | Wilkinson et al. |
| 9,216,358 B2 | 12/2015 | Hess et al. |
| 2002/0107072 A1 | 8/2002 | Giobbi |
| 2003/0070178 A1* | 4/2003 | Boyd ............ G07F 17/32 725/110 |
| 2003/0216168 A1 | 11/2003 | Cannon et al. |
| 2003/0216968 A1* | 11/2003 | Barnhart ............ A63F 3/065 705/14.13 |
| 2004/0005919 A1 | 1/2004 | Walker et al. |
| 2004/0077408 A1* | 4/2004 | D'Amico ............ G07F 17/32 463/42 |
| 2004/0162132 A1 | 8/2004 | Jaffe et al. |
| 2004/0176167 A1 | 9/2004 | Michaelson et al. |
| 2006/0052168 A1 | 3/2006 | Shacham |
| 2006/0160612 A1* | 7/2006 | Parham ............ G07C 15/006 463/25 |
| 2006/0175758 A1 | 8/2006 | Riolo |
| 2006/0287067 A1* | 12/2006 | White ............ G07F 17/32 463/25 |
| 2006/0287103 A1 | 12/2006 | Crawford et al. |
| 2007/0129131 A1* | 6/2007 | Kaminkow ............ G07F 17/32 463/16 |
| 2007/0155460 A1* | 7/2007 | Burnside ............ G07F 17/3211 463/13 |
| 2007/0232398 A1 | 10/2007 | Aikin et al. |
| 2007/0270211 A1 | 11/2007 | Moshal |
| 2008/0026816 A1 | 1/2008 | Sammon |
| 2008/0026826 A1 | 1/2008 | Groswirt |
| 2008/0070659 A1 | 3/2008 | Naicker |
| 2008/0146351 A1 | 6/2008 | Packes |
| 2008/0194334 A1 | 8/2008 | Kuok et al. |
| 2009/0121438 A1 | 5/2009 | Gustafsson |
| 2010/0035694 A1* | 2/2010 | Losica ............ G07F 17/32 463/42 |
| 2010/0120490 A1* | 5/2010 | McLaughlin ....... G07F 17/3209 463/20 |
| 2010/0227675 A1 | 9/2010 | Luxton et al. |
| 2011/0045909 A1 | 2/2011 | Cole |
| 2011/0105208 A1 | 5/2011 | Bickley |
| 2011/0177863 A1* | 7/2011 | Davidson ............ G06Q 90/00 463/29 |
| 2011/0207526 A1* | 8/2011 | Kamano ............ G07F 17/32 463/26 |
| 2011/0212766 A1* | 9/2011 | Bowers ............ G07F 17/32 463/25 |
| 2013/0029739 A1 | 1/2013 | Ramsey et al. |
| 2013/0210512 A1* | 8/2013 | Meyer ............ G07F 17/3269 463/16 |
| 2013/0225282 A1* | 8/2013 | Williams ............ A63F 13/216 463/29 |
| 2013/0244771 A1* | 9/2013 | Hafezi ............ A63F 13/12 463/29 |
| 2013/0244786 A1* | 9/2013 | Hafezi ............ G07F 17/3276 463/42 |
| 2013/0244787 A1* | 9/2013 | Hafezi ............ G07F 17/3276 463/42 |
| 2013/0296036 A1 | 11/2013 | Scott |
| 2014/0194199 A1* | 7/2014 | DiGiovanni ........ G07F 17/3239 463/29 |
| 2015/0031431 A1 | 1/2015 | Burnside |
| 2015/0072747 A1 | 3/2015 | Burnside |
| 2015/0119137 A1 | 4/2015 | Alexander |
| 2015/0221183 A1 | 8/2015 | Colvin et al. |
| 2015/0248814 A1* | 9/2015 | Ottofy ............ G07F 17/3241 463/13 |
| 2015/0254936 A1 | 9/2015 | Stuppler |
| 2016/0071369 A1* | 3/2016 | Graves ............ G07F 17/3241 463/13 |
| 2016/0093169 A1 | 3/2016 | Orcutt |
| 2017/0124804 A1* | 5/2017 | Nelson ............ G07F 17/3255 |

FOREIGN PATENT DOCUMENTS

| | | |
|---|---|---|
| WO | 2007085054 A1 | 8/2007 |
| WO | 2014128735 A1 | 8/2014 |

* cited by examiner

_(10,617,957 B2)_

SYSTEMS AND METHODS FOR REDUCING FRAUD IN ELECTRONIC GAMES HAVING VIRTUAL CURRENCY

RELATED APPLICATIONS

This application claims priority from Chinese Patent Application No. 201610649773.1 filed Jun. 29, 2016, which is incorporated by reference in its entirety.

BACKGROUND OF THE INVENTION

1. TECHNICAL FIELD.

This application is directed to the field of reducing fraud in electronic games having virtual currencies, and more particularly to reducing the effect of hacking, collusion and other abuses in software games having one or more virtual currencies.

2. RELATED ART.

The "freemium" (free +premium) software model allows for software developers to generate revenue on their software while each end user is able to choose how much, if any, money she spends on the software. Usually, freemium software, typically games, operates by implementing some form of in-game virtual currency. Virtual currency is an in-game item that has value in the game, but not in the real world. The virtual currency may have value in the game, for example, because it may be used to enhance the player's abilities, modify actions in the game, purchase other virtual items in the game such as appearance items or the like. In the case of games that involve betting or gambling, virtual currency may be wagered.

End users, or players, may earn virtual currency in a different ways. For example, a game may provide virtual currency to a player if she completes certain tasks or activities in the game, such as playing the game a certain number of times, achieving a particular score, and the like. The game also may issue virtual currency as a bonus gift to the player based on various pre-determined parameters. If the virtual currency is used as a bet or wager, the end user may earn additional currency if she wins the bet or wager. Finally, some games allow end users to purchase virtual currency using actual currency.

As with all things of value, virtual currency and the games that use them are subject to manipulation by nefarious individuals attempting to obtain large amounts of virtual currencies. This is particularly true in games in which virtual currency may be both bought with actual money and obtained for "free" through in-game activities and the like (also called "giveaways"). In some cases, users may hack the game to get more giveaways than the system would otherwise distribute to the user. Hacking the game involves modifying the source code or otherwise manipulating the game software to achieve a particular outcome. As a simple example, players may change the clock setting on a computer to trick the game into performing a time-based action.

In other cases, users may collude with other players or even themselves by consolidating giveaways from multiple accounts. For example, in online poker games, chip dumping is a common occurrence. In a typical chip dumping scenario, one or more players may create multiple accounts and collect a number of "free chips" through giveaways across the multiple accounts. Once a desired number of "free chips" have been collected, the accounts may play on a single table where a designated account will "win" bets against the other accounts to consolidate the "free chips."

Accordingly, a need has long existed for improved systems and methods that solve the technical problems associated with hacking and otherwise fraudulently manipulating electronic games.

SUMMARY

Reducing fraud and collusion in an online multiplayer game having a virtual currency, such as poker chips, may include managing the distribution of virtual currency giveaways and limiting collusion among players likely to be using virtual currency obtained via the giveaways. In some embodiments, free chip distribution pools may be established to limit the amount of free chips distributed via (1) a particular distribution method, (2) to a particular player, (3) a combination of player and distribution method, and the like. In addition, players may be automatically assigned to a particular table and/or seat at the table based on a variety of factors that may indicate a likelihood that the player is using free chips, such as the player's level, the age of the player's account, the buy-in for a given table requested by the user, and the like. Other implementations also are described.

Other systems, methods, features, and technical advantages of the invention will be, or will become apparent to one with skill in the art upon examination of the following figures and detailed description. It is intended that all such additional systems, methods, features, and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the contact management system architecture may be stored on, distributed across, or read from other machine-readable media, for example, secondary storage devices such as hard disks, floppy disks, and CD-ROMs; a signal received from a network; other forms of ROM or RAM either currently known or later developed; and the like.

Furthermore, although specific components of the communications architecture will be described, methods, systems, and articles of manufacture consistent with the contact management system architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, including unstructured data. Programs may be parts of a single program, separate programs, or distributed across several memories and processors. Systems may be implemented in hardware, software, or a combination of hardware and software in one processing system or distributed across multiple processing systems.

Figure 1:
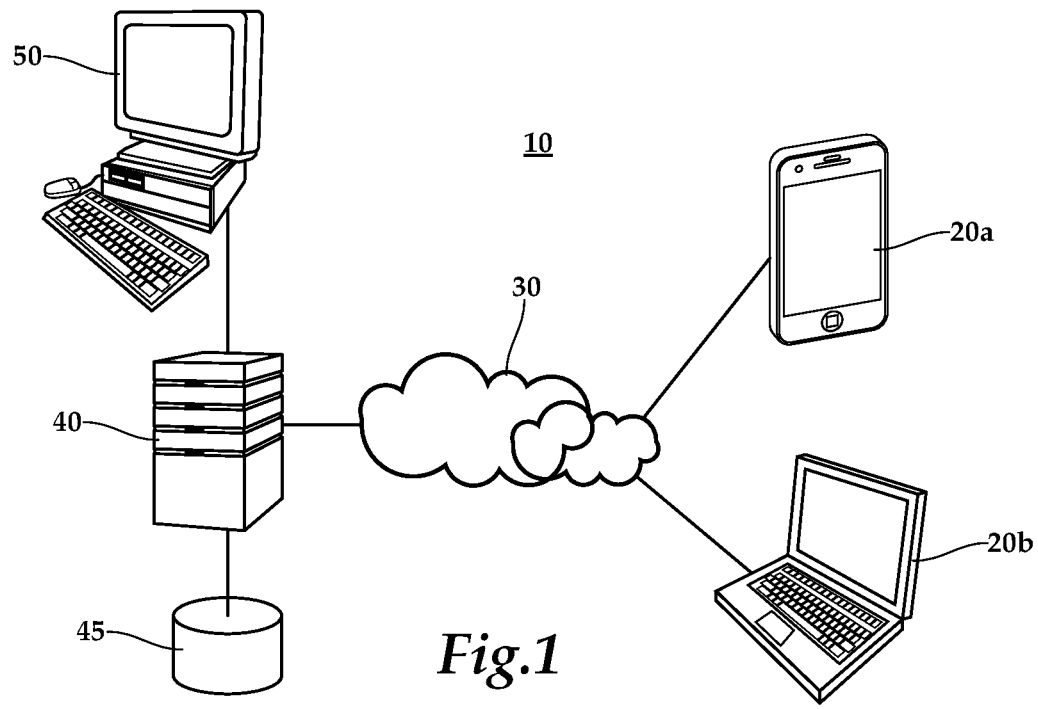
FIG. 1 shows an exemplary physical architecture for an exemplary system for providing an electronic game having a virtual currency.

As shown in FIG. 1, an exemplary architecture 10 for a system for providing an electronic game having one or more virtual currencies is shown. One or more client devices may run client applications 20a and 20b which may communicate with a game server 40 via a communications network 30. The client applications 20a may provide an interface to the user or player and provide game data to the game server 40. In response, the game server 40 may interpret that game data and issue new game data to the client devices 20a and 20b. The game server 40 may store information in one or more databases 45 and also may provide an administrative interface 50 that enables an administrator to interact with the server 40.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, the game server may be implemented as a single server configured to provide all of the systems functionalities, or the functionalities may be implemented across multiple servers.

The client applications 20a and 20b may provide a user interface for the system and may communicate device specific information, user profile information, game data and other information with game server 40 via communications network 30. In one embodiment, client applications 20a and 20b may comprise stand-alone applications which may be either platform dependent or platform independent. For example, client applications 20a and 20b may be stand-alone applications for a mobile phone configured to run on a mobile operating system such as the iOS™ operating system from Apple Inc. located in Cupertino, Calif., the Android™ operating system from Google, Inc. located in Mountain View, Calif., or the like. Alternatively, or additionally, client systems may connect to the game server via the Internet using a standard browser application. Alternatively, or additionally, one or more of the client applications 20a and 20b may be an application configured to run on mobile computer such as a laptop computer, handheld computer, tablet, mobile messaging device, or the like which may all utilize different hardware and/or software packages. Other methods may be used to implement the client devices 20a and 20b.

The communications network 30 may be any type any private or public communication network, such as the Internet, and may include one or more communications networks. In some embodiments, the communications network 30 may be a cellular network such as, for example, a Code Division Multiple Access (CDMA) network, Global System for Mobiles (GSM) network, General Packet Radio Service (GPRS) network, cdmaOne network, CDMA2000 network, Evolution-Data Optimized (EV-DO) network, Enhanced Data Rates for GSM Evolution (EDGE) network, Universal Mobile Telecommunications System (UMTS) network, Digital Enhanced Cordless Telecommunications (DECT) network, Digital AMPS (IS-136/TDMA), Integrated Digital Enhanced Network (iDEN), Long-Term Evolution (LTE) and the like.

The game server 40 may store game data, user profile information and related information in a database 45, receive game data, device data, and user profile information from a client application 20a and 20b, implement game logic, provide a user interface for an administration inerface 50, and the like. As should be apparent to one of ordinary skill in the art from the disclosure herein, other related services may also be provided.

The database 45 may store a variety of information, including user profile information, user preference information, game data, tournament data, and the like. In some embodiments, all information stored in the database 45 is encrypted.

Exemplary Poker Game Using Virtual Currency

Although reference will now be made to certain embodiments described herein with reference to a poker game, the principles presented herein may be used for other games, such as black jack, roulette, slots and the like. In addition, the embodiments presented here may also be used in non-casino games that use virtual currencies. The embodiments illustrated herein should therefore not be interpreted to be exclusive or limiting, but rather exemplary or illustrative.

Figure 2:
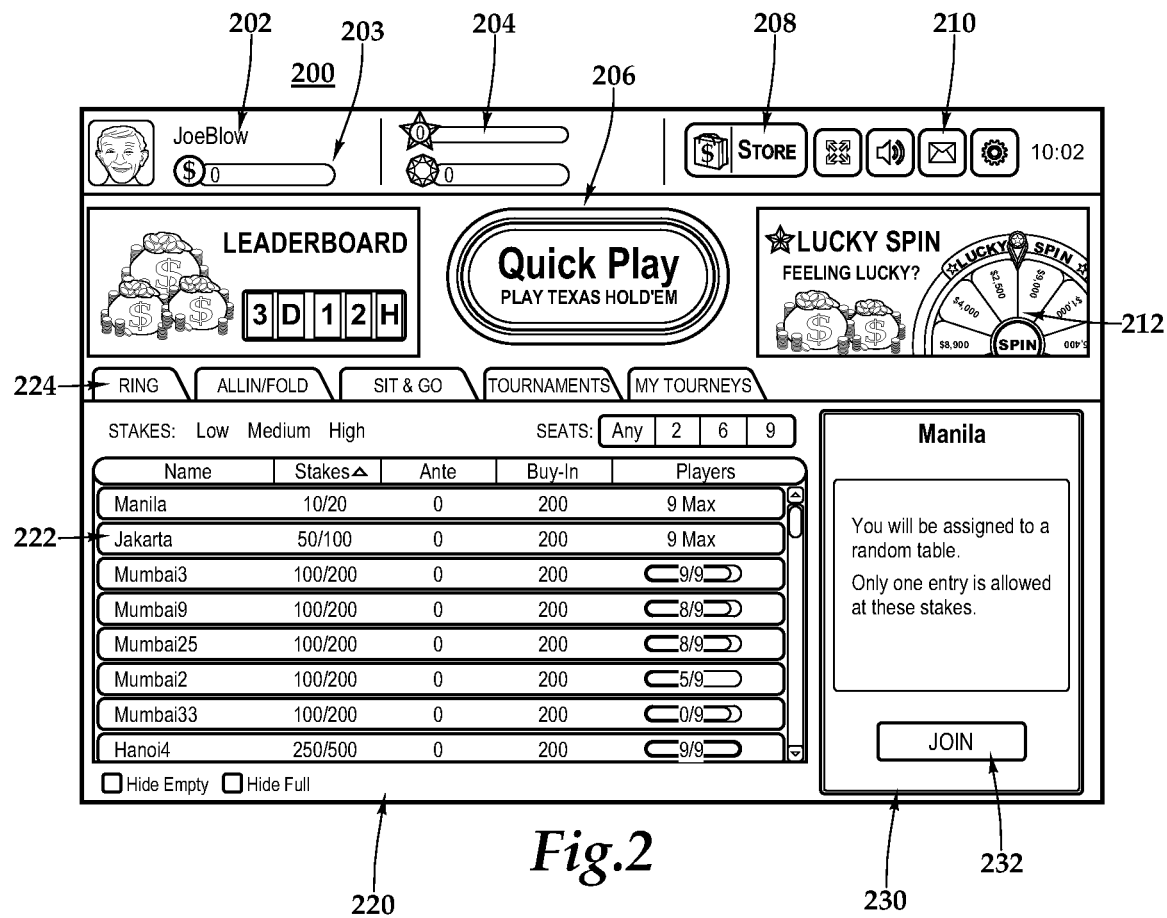
FIG. 2 shows an exemplary screen shot of a an exemplary main poker lobby.

Referring to FIG. 2, an exemplary screen shot of a main poker lobby is shown. Upon logging in to the server 40, the client application 20a may present the player with a main lobby 200 from which the player may select a variety of games 224. Exemplary games may include ring games (or cash-in games) that may be segmented into casual or high-stakes game types, all-in or fold game types, sit-and-go game types (which may offer scaled down tournament type play) and tournament game types. For each game type, a list of available tables 222 may be displayed along with certain game type information, such as a buy-in, number of total seats, number of available seats and the like. Selection of a table from the list 222 may cause additional information to be displayed in a game detail display section 230, which also may provide an interface control 232 for the player to request a seat at the selected table. In the illustrated embodiment, the main lobby 200 may include player indicia 202 that shows the player's name, chip indicia 203 that shows the player's current chip count, level indicia 204 that shows the player's current level (e.g. a numerical representation corresponding to a total number of experience points earned for performing in-game actions), reward point indicia 206 that shows the player's current reward point total.

Figure 3A:
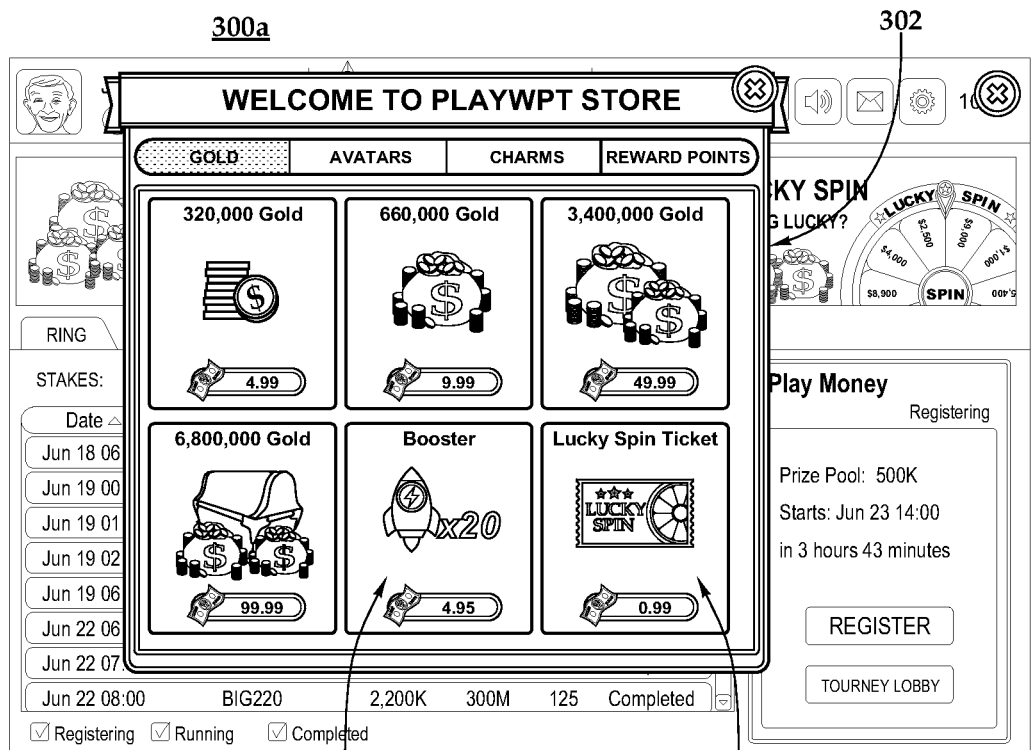
FIGS. 3a-3d show exemplary screen shots of a virtual currency storefront.

In addition, the main lobby 200 may provide an interface control 208 that, upon selection by the user, presents the user with the opportunity to purchase various in-game items. Referring also to FIGS. 3a-3d, exemplary screen shots 300a-300d of a virtual currency storefront is shown. As shown in FIG. 3a, a user may purchase one or more virtual currencies using actual currency or money. In the illustrated embodiment, the user may purchase gold chips 302 that may be used to wager in electronic poker games and purchase other in-game items (as described below and shown in FIGS. 3b and 3c), a booster 304 that may increase virtual currency rewards earned by performing in-game actions such as mini-games, and a lucky spin ticket 306 that may grant the user a chance to win virtual currency through a lucky spin mini-game 212 (described below and shown in FIGS. 4a and 4b).

Figure 3B:
Figure 3C:
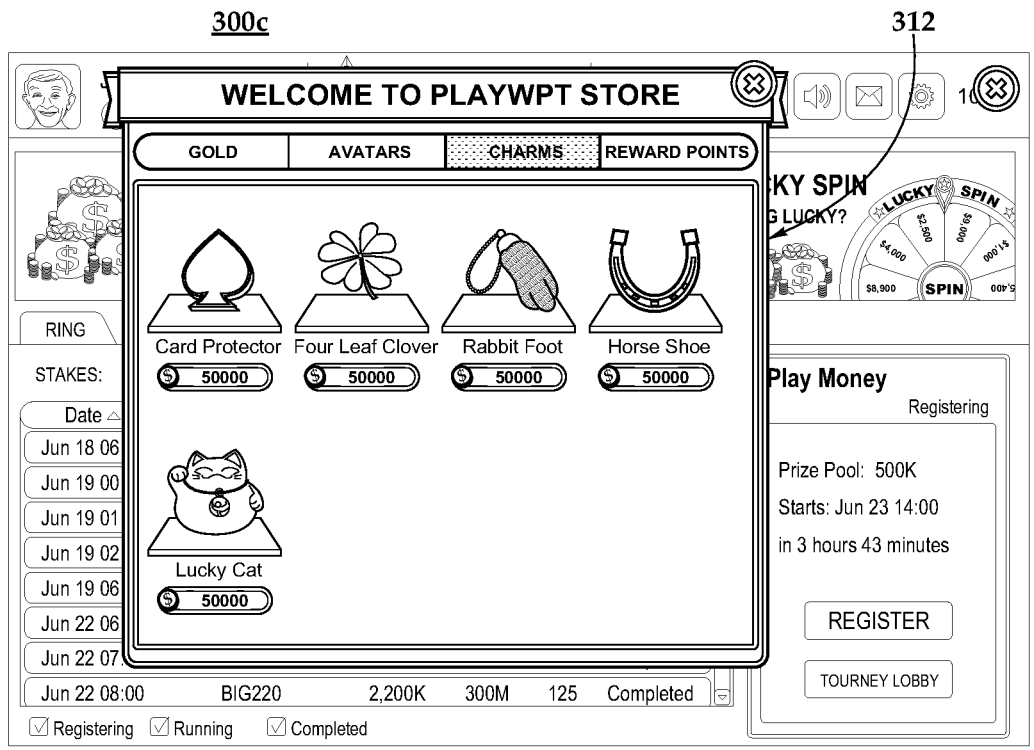
Figure 3D:
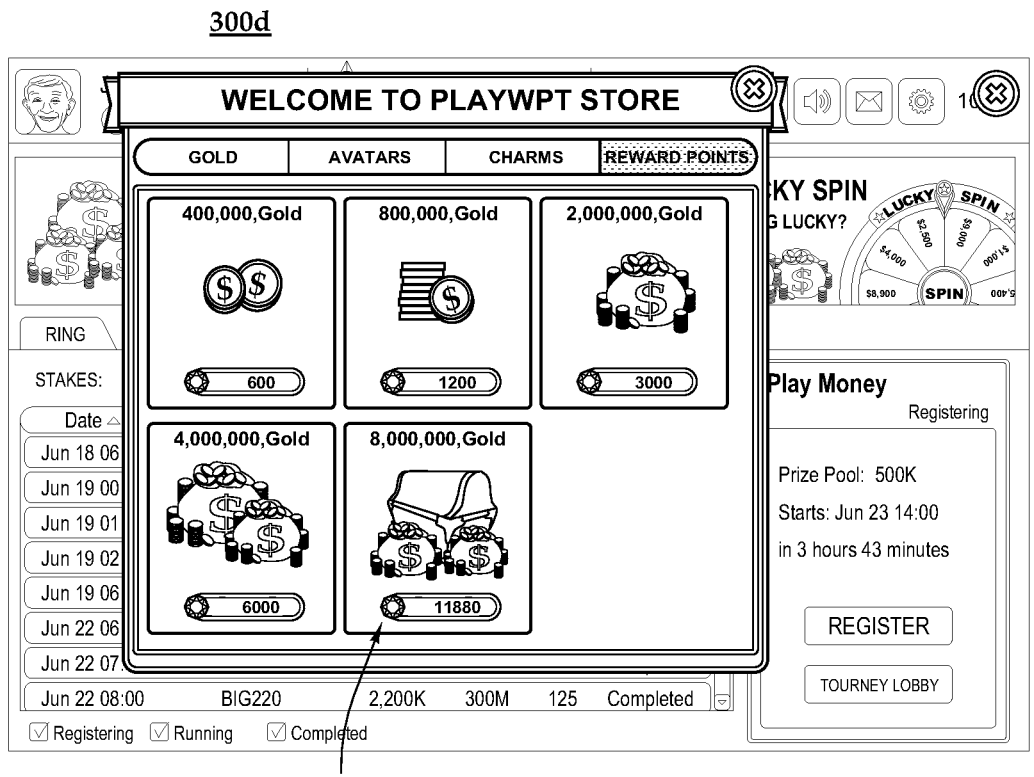
Figure 4A:
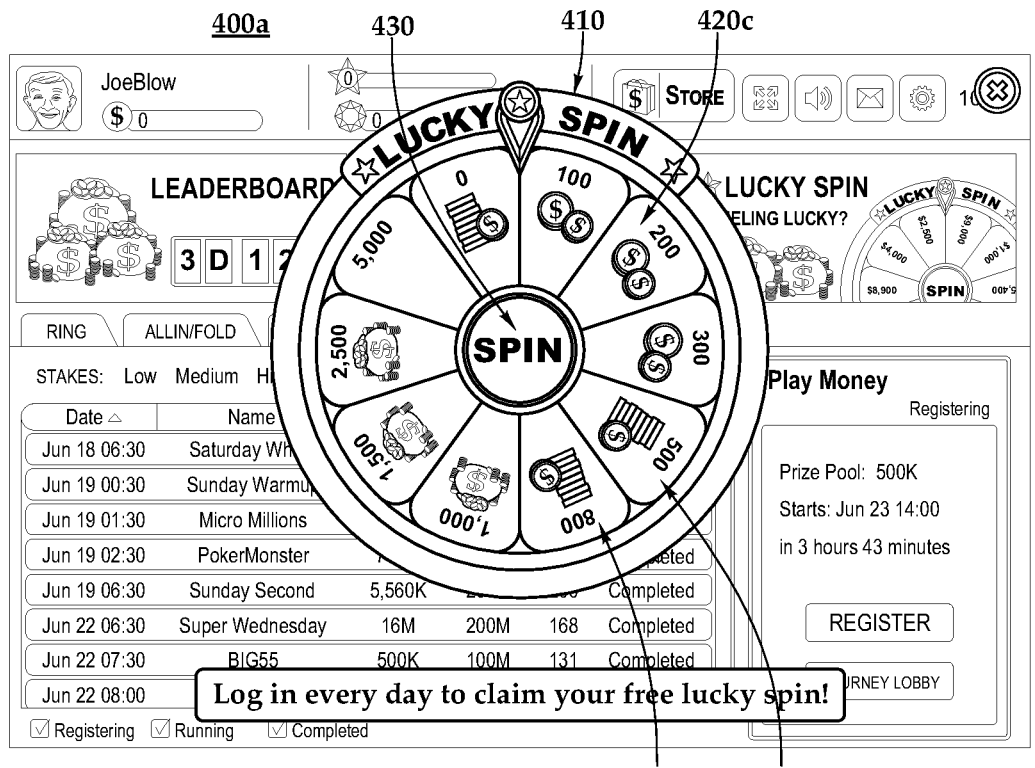
FIGS. 4a-4b show exemplary screen shots of a virtual currency reward mini-game.
Figure 4B:

In some embodiments, the user may be able to purchase additional in-game items using one or more of the virtual currencies. For example, a user may purchase avatars 310 (as shown in FIG. 3b) and charms 312 (as shown in FIG. 3c) using gold chips 302. Avatars 310 may be icons, 3-D cartoon characters or other images that act as visual representations of the user in the game. In some embodiments, a user may be given a default avatar, such as a dark silhouette. Charms 312 may be objects that are traditionally associated with good luck, such as a rabbit's foot, horse shoe, four leaf clover and the like. In some embodiments, a player may be able to transfer a charm 312 to other players. Charms 312 may be permanent, i.e. do not expire. Finally, in some embodiments, players may be able to purchase gold chips 302 using reward points 314.

Figure 5:
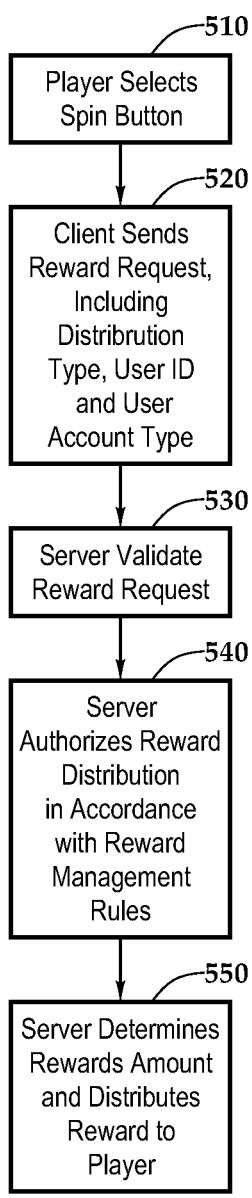
FIG. 5 shows a flowchart for an exemplary process for securely distributing rewards.

Players also may be able to win virtual currency (such as gold chips 302) through one or more mini-games provided by the system 10. An exemplary virtual currency giveaway mini-game is shown in the screenshots 400a and 400b depicted in FIGS. 4a and 4b. In the illustrated embodiment, a player may spin a wheel 410 having multiple segments 420a-c corresponding to multiple prizes. Referring also to FIG. 5, the user may begin the process of obtaining a reward by selecting the spin button 430 at step 510. In response, the client application 20a may send a request for a reward to the game server 40 at step 520. The game server 40 may validate the request at step 530 and authorize the distribution of the reward in light of reward management rules at step 540. If the request is valid and the distribution is authorized, the server 40 may determine a reward amount to the player via the client application 20a at step 550. Rewards may be authorized, for example, if the reward is in compliance with reward management rules, as described. The reward amount may be fixed amount, such as $500 in gold chips 302 or may be selected randomly from a set of possible rewards. Other methods may be used to determine a reward amount. In the example illustrated in FIG. 4b, the system 10 distributed a reward of $200 in virtual currency in response to the player's spin of the lucky wheel.

Reward Management Rules

Game server 40 may authorize distribution of a reward by implementing reward management rules. In some embodiments, the reward management rules may include establishing one or more allotments of rewards that may be distributed by system 10 via a particular reward distribution method. For example, in embodiments that utilize poker chips, a reward allotment may be a pool of free chips that may be distributed via a reward distribution method, such as the lucky spin mini-game shown in FIGS. 4a-b. In some embodiments, free chip pools also may be allocated based on user information, such as a user's IP address, user account type and the like.

Limiting the distribution of free chips may provide several benefits. For example, one benefit that may be obtained by limiting the amount of chips in the game may be a better user experience by encouraging good plays. Another technical benefit that may be obtained by limiting chip distribution is to limit the impact of hackers creating fake accounts or finding a bug in a distribution method, such as the lucky spin mini-game.

Reward allotments (also referred to herein as free chip pools) may be established for each reward distribution method tied to the completion of in-game activities, also referred to as triggering events. For example, rewards may be distributed for completing a player registration process, completing an email validation process, completing a tutorial, playing a reward mini-game such as the lucky spin mini-game described above, collecting a timed reward package (such as a reward package that may be collected on a daily, hourly or other basis). In some embodiments, a set of in-game activities may be grouped, such as playing 100 hands or 500 hands, the completing of which may trigger a reward distribution. In some embodiments, free chips may be distributed to a registered player if their balance falls below a predetermined threshold, such as giving the player 300 chips if their balance falls below 200 chips. Other amounts also may be used.

The size of a reward allotment may be based on an expected number of chips that may be distributed via the pool's associated distribution method based on, for example, an expected or historical daily player count, expected or historical daily new player registrations and the like. Other parameters also may be factored into the size of a free chip allocation pool. Distributed rewards may be deducted from the allotment and reward allotments may be reset or reestablished at set intervals, such as once a day (e.g. 24 hour period), once an hour or the like. Other intervals also may be used.

In one embodiment, reward allotments may be established as follows: a first allotment of 11,500,000 may be established for the total amount of free chips that may be distributed in a 24 hour period; a second allotment of 1,500,000 may be established for rewards for email validation for a 24 hour period, and a third allotment of 10,000,000 may be established for reward via the lucky spin mini-game for a 24 hour period. The server 40 may compare a request for a reward distribution against one or more relevant reward allotments before authorizing the reward. If distribution of the reward would exceed an allotment, the request may be denied. If not, the reward amount may be subtracted from the reward allotment and the reward may be distributed to the player.

Other reward management rules also may be implemented. For example, a user may be limited to a predetermined number of uses of a distribution method over a given time. For example, a player may be limited to one spin of the lucky spin mini-game per day unless the player purchases additional spins as described above. As another example, a player may be limited to a single distribution for verifying an email account associated with the player's game account over the life of that game account. Other distribution methods limitations may be implemented.

Automatch

Another method by which the system 10 may prevent fraudulent behavior is by limiting the ability of players to choose a particular table or seat in certain conditions that indicate the player is likely to be using free chips. In some embodiments, conditions that indicate the player is likely to be using free chips may be table properties for the requested table, user properties for the requesting user, and the like. For example, players at low stakes tables and/or players with relatively new accounts may be likely to be using free chip.

The age of an account may be based on chronological time, in-game activity (such as a number of hands played and the like). Other conditions also may be used to indicate a likelihood that a player is using free chips.

Figure 6:
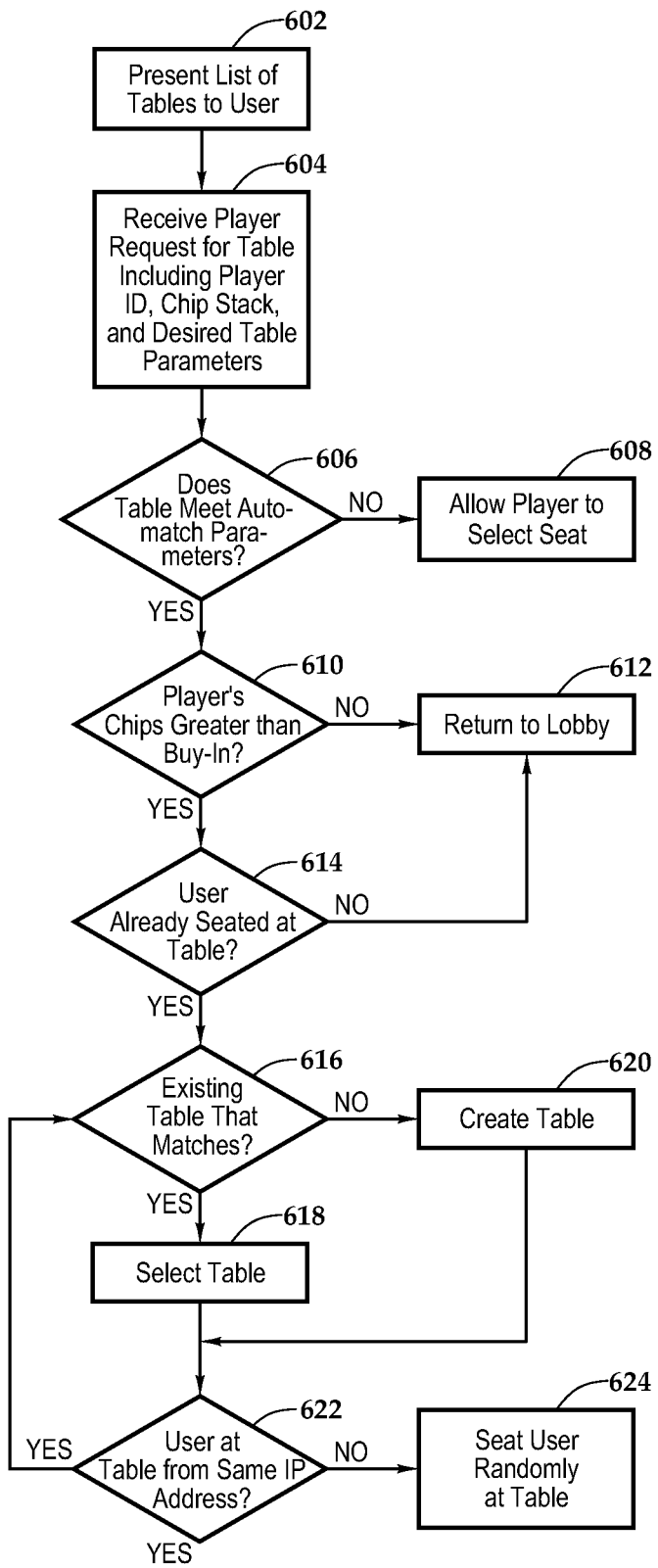
FIG. 6 shows a flowchart for an exemplary process for automatically seating a user at a table.

Referring to FIGS. 2 and 6, a player may be presented with a list of available tables or table types 220 at step 602. The player may request to play at a selected table or table type from the list by selecting a corresponding interface control 232, which causes a request to join the selected table or table type to be received by the server 40 at step 604. The request may include a player identifier, the player's IP address, the player's current chip stack, and table parameters for the desired table or table type. The server 40 may determine if seating at the selected table or table type is restricted or limited at step 606. If not, the player may be allowed to select a seat at the requested table at step 608. If the selected table or table type does have restricted or limited seating, the system may determine if the player's chip stack is equal to or greater than a buy-in associated with the table at step 610. If the player's chip stack is not large enough, the player may be returned to the lobby at step 612.

Figure 7:
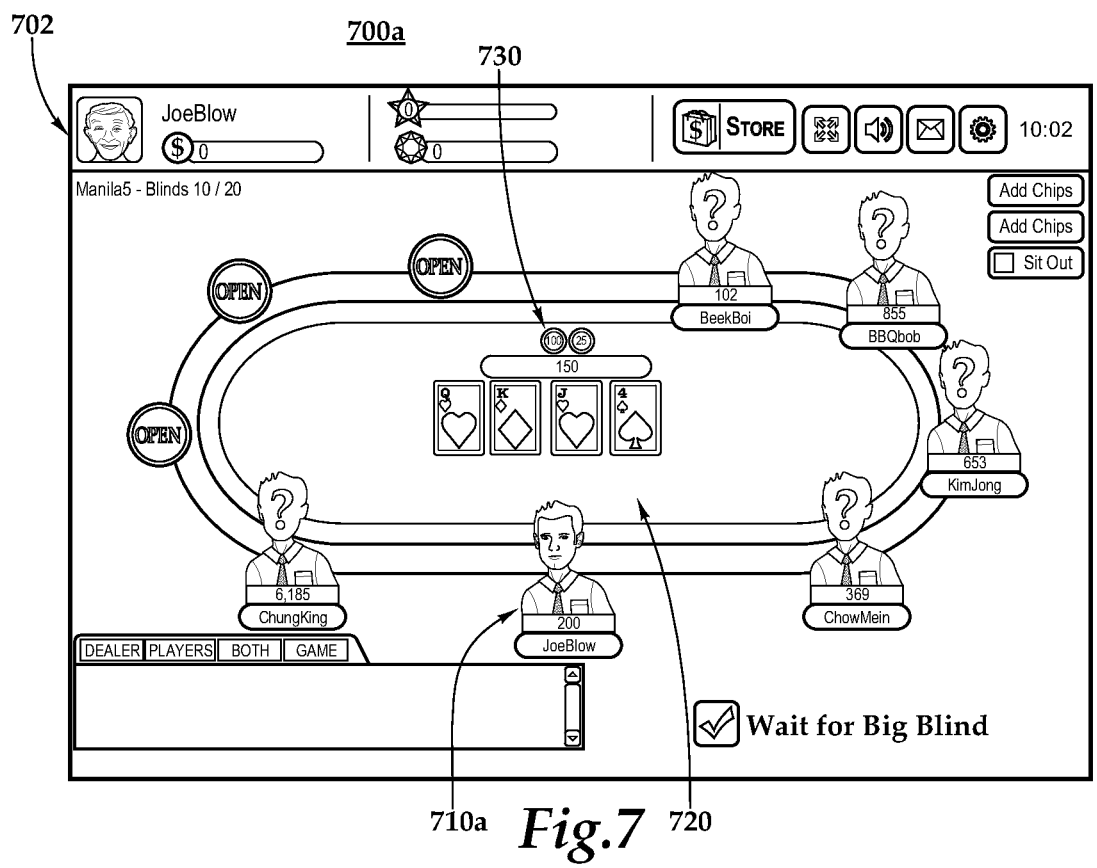
FIG. 7 shows an exemplary flowchart of a user seated at a poker game table.

Optionally, the server 40 may prevent the player from sitting at more than one table if it is likely that the player is using free chips. In such embodiments, the server 40 may determine if the user already is seated at a table at step 614 and, if so, the player may be returned to the lobby at step 612. If the player is not already seated at another table, the server 40 may determine if there are any open seats at an existing table that meets the requested table parameters at step 616 and, if so, may select that table at step 618. If no such table exists, the server 40 may create and select a new table that meets the requested table parameters at step 620. In either case, the system may determine whether any other players at the selected table have a common IP address with the requesting player at step 622 as a further step to reduce collusion among multiple accounts. If so, the player may be returned to the lobby at step 612. If no other players at the selected table share a common IP address with the requesting player, the server 40 may randomly select a seat and sit the player at the selected table and seat at step 624. As a result, the player may play at a table having their desired characteristics (as shown in FIG. 7) in an environment in which the abuses of fraud, collusion, hacking and other unethical behavior unique to electronic games is reduced.

A system for reducing fraud, hacking and other exploitive behavior in an electronic game may comprise a first software module for use on a first device comprising one or more processors and one or more memories and a second software module for use on the server computer comprising one or more processors and one or more memories. The first software module may include instructions stored on a non-transitory computer readable medium that: provide a user interface to a user, the user interface including controls that allow a user to request a reward of an amount of a virtual currency via one or more reward distribution methods; transmit, to a server computer, a request for the reward via a first of the one or more reward distribution method. The second software module may include instructions stored on a non-transitory computer readable medium that: establish a reward allotments for each of said one or more reward distribution methods; receive the request from the first device; determine a reward amount to distribute to the user in response to the received request; and if the reward allotment for the first of the one or more reward distribution methods is greater than the reward amount, subtract the reward amount from the reward allotment for the first of the one or more reward distribution methods and distribute the reward amount to the user.

The reward allotment may be reestablished daily.

The reward amount may be randomly selected from a set of possible rewards.

The reward distribution methods may include at least one selected from the group comprising a player registration process, an email validation process, a tutorial, a reward mini-game and a timed reward package.

The reward allotment may be for the total amount of reward distributions that may be distributed on a given 24 hour period through all reward distribution methods.

The first software module may further include instructions stored on a non-transitory computer readable medium that: present a list of available tables to the user; receive a selection of one of the listed tables; and transmit, to the server computer, a request to play at the selected table. The second software module may further include instructions stored on a non-transitory computer readable medium that: receive, from the first device, the request to play at the selected table; determines if the selected table has restricted seating and if so, automatically sits the user at a table in accordance with restricted seating rules.

The determining if the selected table has restricted seating may include determining if a buy-in associated with the selected table falls below a predetermined threshold.

The automatic seating of the user at a table in accordance with restricted seating rules may include determining if a player's virtual currency total is equal to or greater than a buy-in associated with the selected table.

The automatic seating of the user at a table in accordance with restricted seating rules may include determining if the player is already seated at another table.

The player may have an associated IP address and the automatic seating of the user at a table in accordance with restricted seating rules may include determining if a second player having a common IP address with the player is already seated at the selected table.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for improving security and reducing fraud, hacking and other exploitive behavior in an electronic game played by a plurality of players, each player having an associated IP address, comprising:

a first software module for use on a first device comprising one or more processors and one or more memories, the first software module including instructions stored on a non-transitory computer readable medium that:
present a lobby to a player having an associated IP address;
provide a user interface including controls that allow the player to purchase a virtual currency for use in a game of chance and to earn a reward of a free amount of the virtual currency for completing one of a plurality of activities, the activities each associated with at least one of a plurality of reward distribution methods, where at least one activity is independent of the game of chance;

transmit, to a server computer, a request for the reward via a first of the plurality of reward distribution methods in response to the completion of the activity;

present a list of available tables to the player;

receive a selection of one of the listed tables;

transmit, to the server computer, the player's IP address and a request to play at the selected table;

and a second software module for use on the server computer comprising one or more processors and one or more memories, the second software module including instructions stored on a non-transitory computer readable medium that:

improve security by establishing an allotment for each of said plurality of reward distribution methods, the allotment comprising a total amount of free virtual currency that may be distributed to all players through a respective one of the plurality of reward distribution methods;

receive the request for the reward from the first device;

determine a reward amount to distribute to the player in response to the received request;

improve security by determining if the allotment for the first of the one or more reward distribution methods is greater than the reward amount and if so, subtract the reward amount from the allotment for the first of the one or more reward distribution methods and distribute the reward amount to the player;

receive, from the first device, the request to play at the selected table; and improve security by determining if a user having a common IP address with the player is already seated at the selected table and if so, return the player to the lobby to select a new table.

2. The system of claim 1, where the allotment is reestablished daily.

3. The system of claim 1, where the reward amount is randomly selected from a set of possible rewards.

4. The system of claim 1, where the plurality of reward distribution methods include at least one selected from the group comprising a player registration process, an email validation process, a tutorial, a reward mini-game and a timed reward package.

5. The system of claim 4, further including an allotment for the total amount of rewards that may be distributed in a given 24 hour period through all reward distribution methods.

6. The system of claim 1, further comprising determining if a buy-in associated with the selected table falls below a predetermined threshold.

7. The system of claim 1, further comprising determining if a player's virtual currency total is equal to or greater than a buy-in associated with the selected table and if not, returning the player to the lobby.

\* \* \* \* \*